UNITED STATES PATENT OFFICE.

SÖREN SCHOUGAARD, OF COPENHAGEN, DENMARK.

METHOD OF MAKING ARTIFICIAL STONE.

SPECIFICATION forming part of Letters Patent No. 657,296, dated September 4, 1900.

Application filed May 31, 1900. Serial No. 18,526. (No specimens.)

*To all whom it may concern:*

Be it known that I, SÖREN SCHOUGAARD, master mason, a subject of the King of Denmark, residing at Nörrebrogade 42, Copenhagen, Denmark, have invented an Improved Method of Making Artificial Marble, (for which I have made application for a Danish patent, dated January 22, 1900,) of which the following is a specification.

My invention relates to an improved method of making artificial marble.

The hitherto-known methods of making artificial marble are subject to several drawbacks, and among others the difficulty in producing large slabs of sufficient thinness not liable to warping. Another drawback consists in the necessity of liberally greasing the molds wherein the mass is shaped to prevent the mass from sticking to them when the molds are to be emptied. These drawbacks do not in the least attach to the method of my invention, and which is as follows: Reckoning by measure, two parts of animal glue, four parts of alum, and 0.8 parts of gum-arabic are dissolved in one hundred parts of water, whereafter so much double-burnt gypsum is added as to produce a pappy mass of convenient consistency, to the whole being finally added a color soluble in water and similar to the color of the marble to be imitated. To produce artificial marble slabs, the thus-prepared mass is extended in thin layers of about two centimeters thickness either on a plate of glass or any other smooth and level surface, remaining thereon for a few days, when the mass will have sufficiently hardened to allow the thus-obtained marble slab being set up for drying, which will be completed within about a fortnight. If instead of slabs differently-shaped marble is to be produced— such as, for instance, capitals, ornaments, or the like—molds are used in the ordinary way. Neither these molds nor the glass plate and the like need to be greased, as the above mass does not stick to any surface. On having completely hardened the produce can be polished either with wax, polishing spirits, or in any other convenient manner.

What I claim, and desire to secure by Letters Patent of the United States, is—

The method of making artificial stone consisting in dissolving animal glue, alum and gum-arabic in water in about the proportions stated, adding to this mixture so much double-burnt gypsum as to produce a pappy mass of convenient consistency, mixing therewith a color soluble in water and molding the mass in the shapes into which it is to harden.

In testimony whereof I affix my signature in presence of two witnesses.

SÖREN SCHOUGAARD.

Witnesses:
A. POULSEN,
J. C. JACOBSEN.